US012388775B2

(12) United States Patent
Brooks et al.

(10) Patent No.: US 12,388,775 B2
(45) Date of Patent: *Aug. 12, 2025

(54) MESSAGING SYSTEM APPARATUSES CIRCUITS AND METHODS OF OPERATION THEREOF

(71) Applicant: TigerConnect, Inc., Santa Barbara, CA (US)

(72) Inventors: Andrew Brooks, Los Angeles, CA (US); Brad Brooks, Beverly Hills, CA (US); Sumeet Bhatia, Los Angeles, CA (US); Jeffrey Evans, Calabasas, CA (US)

(73) Assignee: TigerConnect, Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/680,967

(22) Filed: May 31, 2024

(65) Prior Publication Data

US 2024/0406126 A1 Dec. 5, 2024

Related U.S. Application Data

(63) Continuation of application No. 18/201,610, filed on May 24, 2023, now Pat. No. 12,041,019, which is a
(Continued)

(51) Int. Cl.
| | | |
|---|---|---|
| H04L 51/04 | (2022.01) | |
| G06F 21/10 | (2013.01) | |
| G06Q 10/107 | (2023.01) | |
| H04L 9/40 | (2022.01) | |
| H04L 51/06 | (2022.01) | |
| H04L 51/08 | (2022.01) | |
| H04L 51/214 | (2022.01) | |
| H04L 51/222 | (2022.01) | |
| H04L 51/224 | (2022.01) | |

(Continued)

(52) U.S. Cl.
CPC ............. *H04L 51/04* (2013.01); *G06F 21/10* (2013.01); *G06Q 10/107* (2013.01); *H04L 51/06* (2013.01); *H04L 51/08* (2013.01); *H04L 51/214* (2022.05); *H04L 51/222* (2022.05); *H04L 51/224* (2022.05); *H04L 51/23* (2022.05); *H04L 51/56* (2022.05); *H04L 63/08* (2013.01); *H04L 63/102* (2013.01); *H04W 4/12* (2013.01); *G06F 2221/2111* (2013.01)

(58) Field of Classification Search
CPC ...... H04L 51/00; H04L 51/212; G06F 16/273
See application file for complete search history.

(56) References Cited

U.S. PATENT DOCUMENTS

| | | | | |
|---|---|---|---|---|
| 2002/0046286 A1* | 4/2002 | Caldwell | ............... | G06F 16/273 709/229 |
| 2003/0131063 A1* | 7/2003 | Breck | ................... | H04L 51/212 709/206 |
| 2010/0037050 A1* | 2/2010 | Karul | ..................... | H04L 51/00 713/167 |

* cited by examiner

*Primary Examiner* — Dustin Nguyen
(74) *Attorney, Agent, or Firm* — White and Williams LLP

(57) ABSTRACT

Disclosed are a messaging system, apparatuses circuits and methods of operation thereof. A messaging client device is adapted to receive an impermanent message and to manage the received message in accordance with a message management policy associated with the message. An impermanent messaging server is adapted to validate said messaging client device as complying with message management policies prior to authorizing transmission of the message to said messaging client device.

21 Claims, 19 Drawing Sheets

Related U.S. Application Data continuation of application No. 17/864,109, filed on Jul. 13, 2022, now Pat. No. 11,700,216, which is a continuation of application No. 17/202,725, filed on Mar. 16, 2021, now Pat. No. 11,425,061, which is a continuation of application No. 16/750,865, filed on Jan. 23, 2020, now Pat. No. 10,986,049, which is a continuation of application No. 16/232,160, filed on Dec. 26, 2018, now Pat. No. 10,581,768, which is a continuation of application No. 15/899,162, filed on Feb. 19, 2018, now Pat. No. 10,205,689, which is a continuation of application No. 15/261,854, filed on Sep. 9, 2016, now Pat. No. 9,935,902, which is a continuation of application No. 13/046,862, filed on Mar. 14, 2011, now Pat. No. 9,489,661, which is a continuation of application No. 13/063,763, filed as application No. PCT/IB2011/050629 on Feb. 15, 2011, now Pat. No. 9,443,227.

(60) Provisional application No. 61/381,141, filed on Sep. 9, 2010, provisional application No. 61/304,810, filed on Feb. 16, 2010.

(51) Int. Cl.
*H04L 51/23* (2022.01)
*H04L 51/56* (2022.01)
*H04W 4/12* (2009.01)

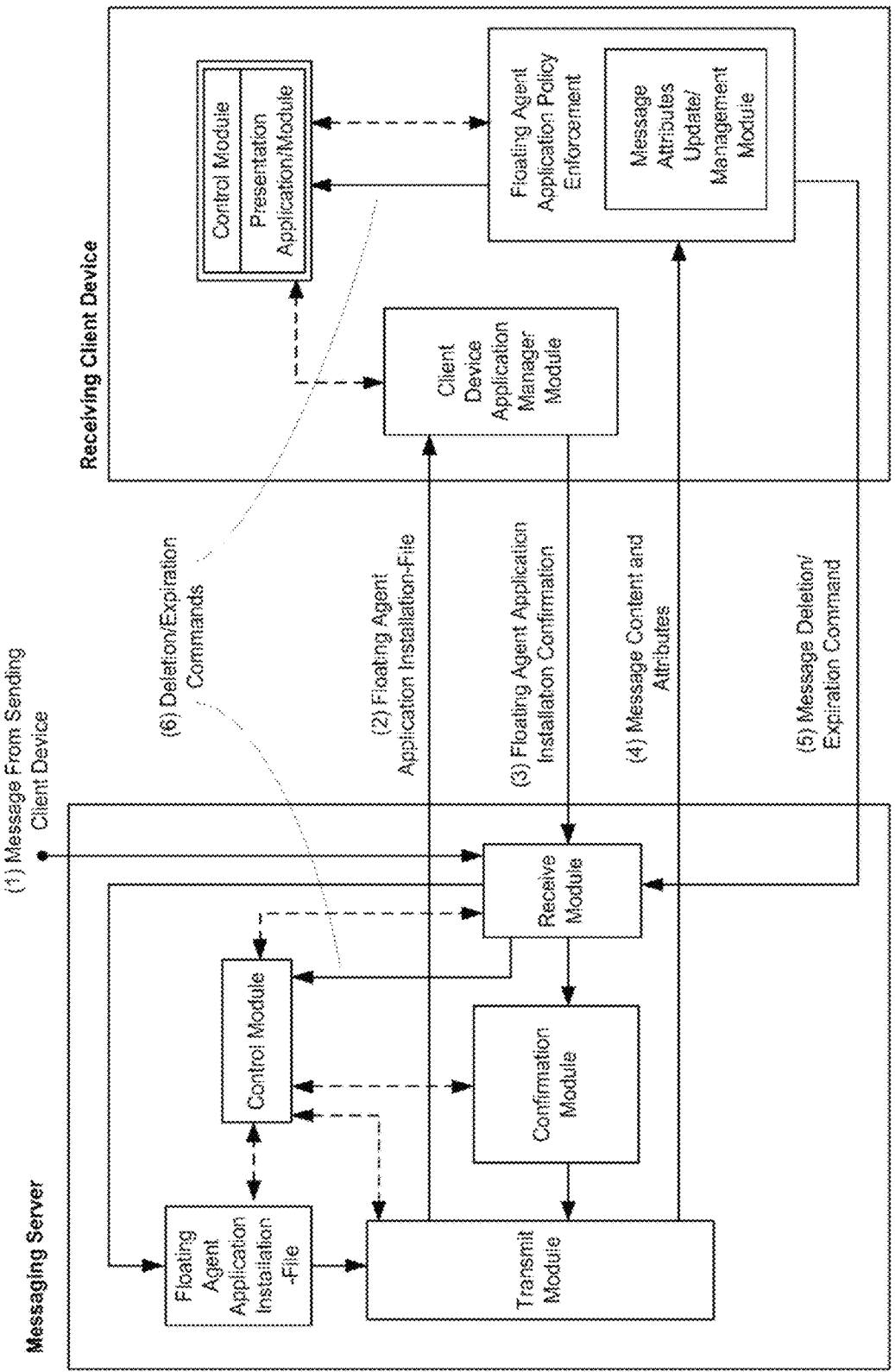

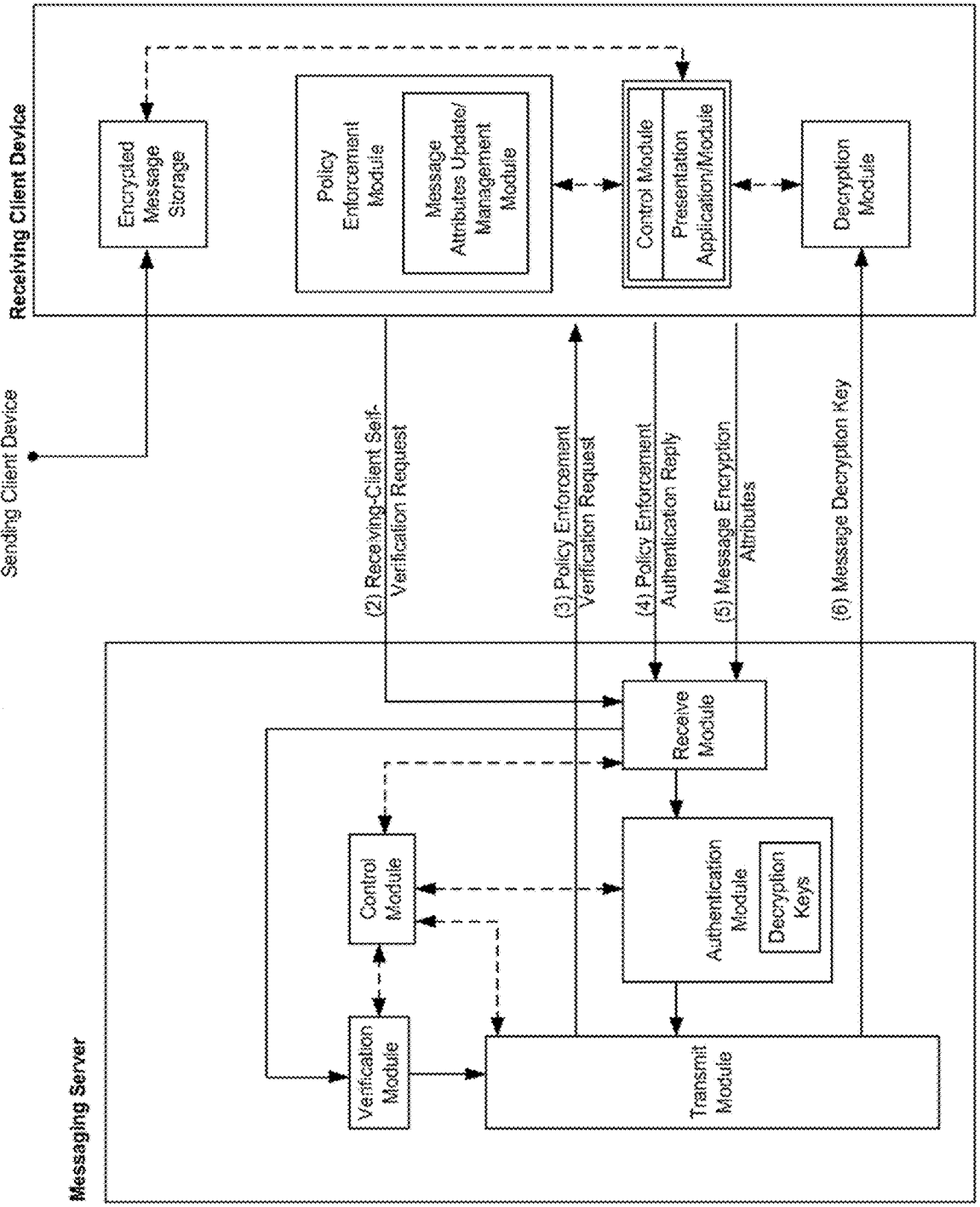
Fig. 5F  Enforcement by Receiving Client (Encrypted I)

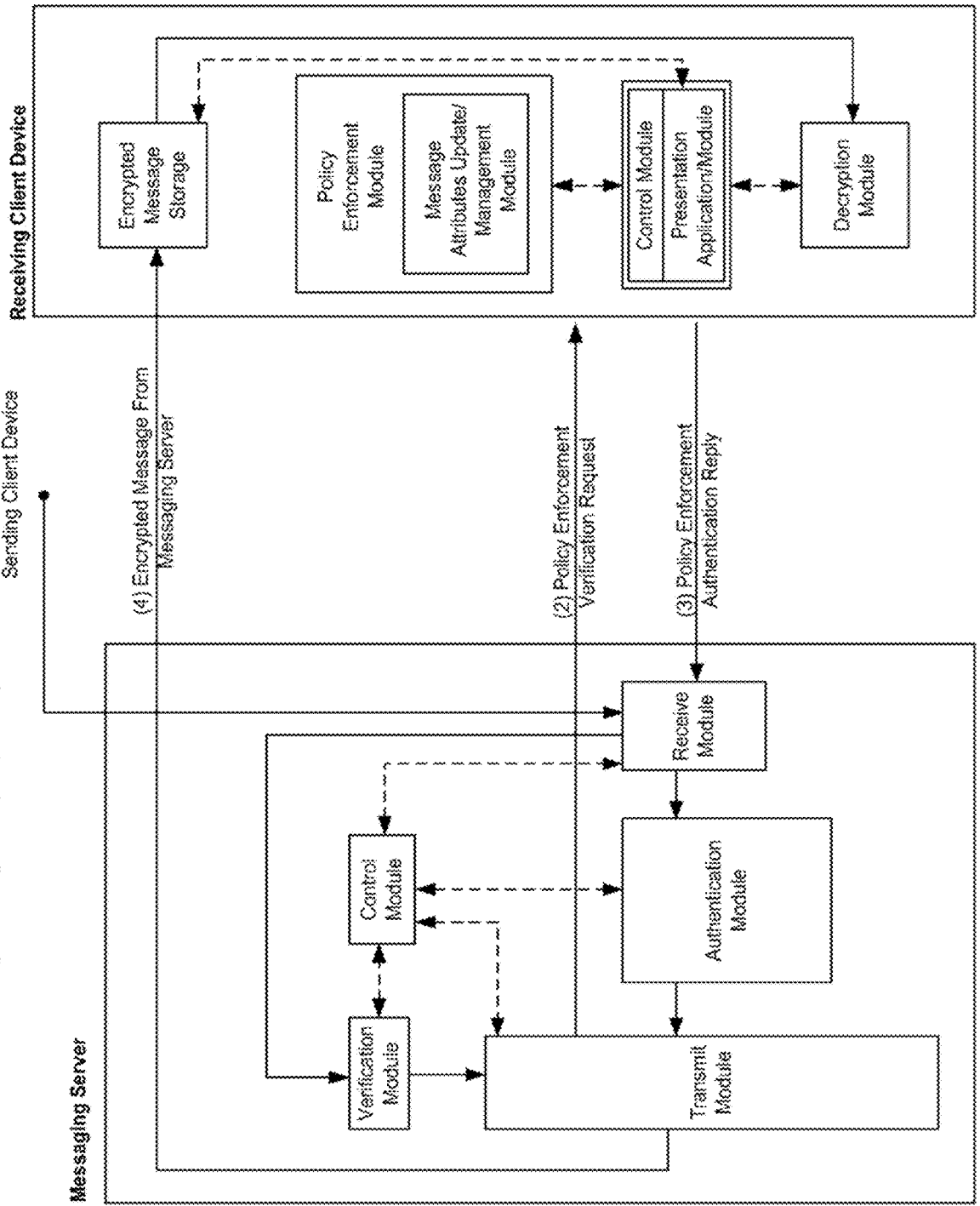

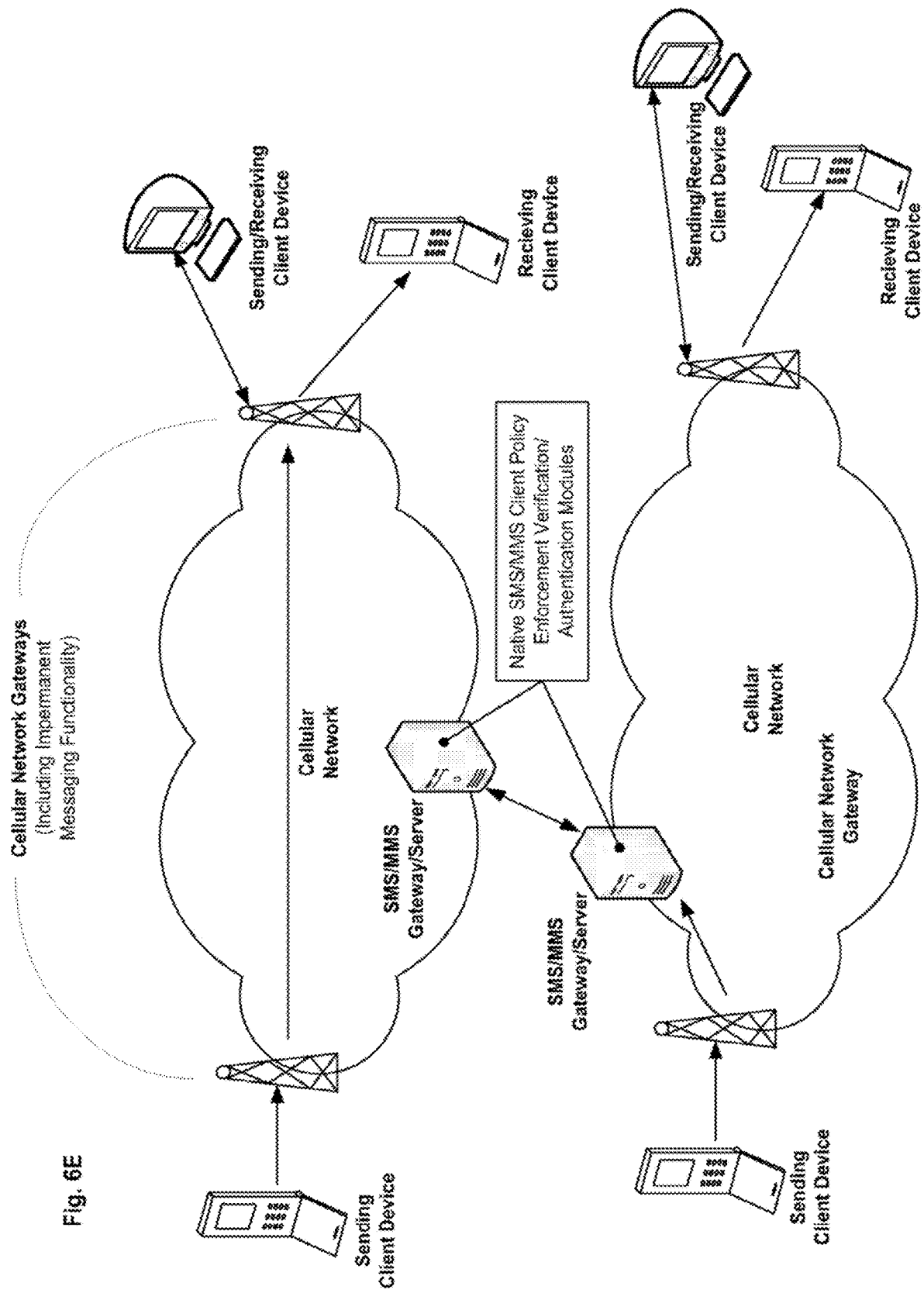

MESSAGING SYSTEM APPARATUSES CIRCUITS AND METHODS OF OPERATION THEREOF

This application is a continuation of U.S. patent application Ser. No. 18/201,610, filed May 24, 2023, now U.S. Pat. No. 12,041,019, which is a continuation of U.S. patent application Ser. No. 17/864,109, filed Jul. 13, 2022, now U.S. Pat. No. 11,700,216, which is a continuation of U.S. patent application Ser. No. 17/202,725, filed Mar. 16, 2021, now U.S. Pat. No. 11,425,061, which is a continuation of U.S. patent application Ser. No. 16/750,865, filed Jan. 23, 2020, now U.S. Pat. No. 10,986,049, which is a continuation of U.S. patent application Serial No. 16/232,160, filed Dec. 26, 2018, now U.S. Pat. No. 10,581,768, which is a continuation of U.S. patent application Ser. No. 15/899,162, filed Feb. 19, 2018, now U.S. Pat. No. 10,205,689, which is a continuation of U.S. patent application Ser. No. 15/261,854, filed Sep. 9, 2016, now U.S. Pat. No. 9,935,902, which is a continuation of U.S. patent application Ser. No. 13/063,763, filed Mar. 14, 2011, now U.S. Pat. No. 9,443,227, which is a continuation of U.S. patent application Ser. No. 13/046,862, filed Mar. 14, 2011, now U.S. Pat. No. 9,489,661, which is the National Stage of International Application No. PCT/IB 11/050629, filed Feb. 15, 2011, which claims the benefit of U.S. Patent Application Ser. No. 61/381,141, filed Sep. 9, 2010, and U.S. Patent Application Ser. No. 61/304,810, filed Feb. 16, 2010.

FIELD OF THE INVENTION

The present invention generally relates to a messaging system, apparatuses circuits and methods of operation thereof. More specifically, the present invention relates to a messaging system wherein one or more of the messages contain message attributes, defining the characteristics of parameters such as the message's lifespan, accessibility and/or functionality.

BACKGROUND

More than 2.5 billion text messages are sent in the U.S. daily, with consumers often using text messages or e-mails to replace casual conversation and businesses increasingly relying on mobile messaging as means of instructing and updating staff with regard to enterprise related matters. Various other messaging platforms and techniques have been developed and are in the works. However, a common deficiency of all known current messaging types and platforms is that once a message has been sent out and was received at a recipient device, no further intervention by the sender relating to any of the message's content and characteristics can be made.

Taking the above into account, there clearly remains a need for better and more efficient messaging systems, apparatuses, circuits and methods of operation thereof, that may allow for the expiration (e.g. deletion) of a message and/or the manipulation of a message's characteristics (e.g. functionality limitation) after it was received at its destination.

SUMMARY OF THE INVENTION

Below are described a number of novel, innovative features of a messaging system, apparatuses circuits and methods of operation thereof.

The present invention is a messaging system, apparatuses circuits and methods of operation thereof. A message, in accordance with some embodiments of the present invention, may comprise one or more message attributes, defining the characteristics of parameters such as its lifespan, accessibility and/or functionality. The message attributes may include, for example, limitations relating to the time duration through which the message may be accessed, the number of times the message may be accessed, the geographical area in which the message may be accessed, the ability to print the message, the ability to save the message, the ability to forward the message and/or any other way in which the message's functionality may be limited.

According to some embodiments of the present invention, the message attributes may be defined/authored by a user of a sending client device. According to some embodiments of the present invention, a messaging server may append and/or add additional message attributes to a message, and/or edit message attributes defined/authored by the user of the sending client device. According to some embodiments of the present invention, a message authoring application may allow for the user of the sending client device to compose and/or edit the message's content and attributes.

According to some embodiments of the present invention, one or more message attributes policies each comprising one or more message functionality limitations may be defined. The message attributes policies may be enforced based, for example, on characteristics such as message content and/or recipient group/position.

According to some embodiments of the present invention, an enforcement module may be adapted to enforce the message attributes. According to some embodiments, a receiving client device may comprise an enforcement module adapted to enforce the message attributes on some or all of its incoming messages. The enforcement module may erase and/or limit the functionality of a given message based on its message attributes, substantially at the time of receipt and/or as certain attribute defined threshold(s) is/arc met (e.g. delete the message once a certain amount of time has passed from its time of receipt). According to some embodiments of the present invention, the messaging server may comprise an authentication module and/or a verification module adapted to authenticate the receiving client device and/or to verify its message attribute enforcement capabilities (e.g. the existence/functionality of its enforcement module circuit/application), prior to forwarding a message to it.

According to some embodiments of the present invention, the messaging server may send the receiving client device a floating agent application installation file, adapted to install itself on the receiving client device and to enforce the message attributes, prior to forwarding the message to it. Once a floating agent application installation notification, confirming the installation of the floating agent on the receiving client device, is received by the messaging server, the server may proceed to forward the message to the receiving client device. The now installed floating agent application may enforce the message attributes.

According to some embodiments of the present invention, relating to direct device to device communications, for example, peer to peer type networks; the sending client device may comprise an authentication module and/or a verification module adapted to authenticate the receiving client device and/or to verify its message attribute enforcement capabilities (e.g. the existence/functionality of its enforcement module circuit/application). Once the receiving client device has been authenticated/verified, the sending client device may send the message directly to it. The receiving client device's policy enforcement module may issue an expiration, functionality-limitation and/or deletion command upon expiration of one or more of the message's expiration attributes.

According to some embodiments of the present invention, the messaging server may comprise an enforcement module adapted to enforce the message attributes on some or all of its incoming messages. The enforcement module may erase and/or limit the functionality of a given message based its message attributes, substantially at the time of receipt and/or as certain attribute defined threshold(s) is/are met (e.g. delete the message once a certain amount of time has passed from its time of receipt). The messaging server may comprise a message page generation and storage module adapted to generate and store a browser renderable code (e.g. HTML page, WAP page), herein code includes message content. The messaging server may then send the receiving client device a link to the message content including page. The messaging server's enforcement module may check and possibly update a given message's attribute(s) intermittently (e.g. as time to expiration and deletion of a message is decreasing), each time the page including the message is linked (e.g. as the number of attribute allowed message views decreases with each linkage to it) and/or as a result of an external intervention by an administrator/owner using an attribute update/management module, of the messaging server, adapted to allow for deleting, editing and/or appending message attributes and/or message attribute policies. Upon expiration of one or more message attributes, and possibly the deletion of the message, a message deletion/expiration notification may be send to the receiving client device by the messaging server.

According to some embodiments of the present invention, an attribute containing message may be encrypted by the sending client device prior to its sending. The message may be decrypted by the receiving client device, by the messaging server or by combination of both the client receiving device and the messaging server (e.g. server holds public decryption keys, server acts as the certificate authority).

According to some embodiments of the present invention, exemplary system configurations for handling and communicating impermanent and/or function-limiting attribute(s) containing messages may include: direct device to device communication configurations; configurations wherein client devices may directly send/receive impermanent/function-limiting messages to each other. Impermanent/function-limiting messaging functionality enforcement verification data is initially communicated over one or more cellular and/or one or more distributed networks between the two client devices; configurations wherein some or all of the messaging system functionalities may be implemented on a cellular and/or distributed network's gateway or gatekeeper server(s); configurations wherein cellular network gateways comprise impermanent/function-limiting messaging functionality; configurations wherein client devices of one or more cellular networks and/or distributed networks may send/receive impermanent/function-limiting messages to each other; configurations wherein client devices of different cellular networks may send/receive impermanent/function-limiting messages to each other; configuration wherein client devices of similar and/or different enterprise networks may send/receive impermanent/function-limiting messages to each other; and direct device to device communication configurations (e.g. peer to peer) wherein each sending and/or receiving device may comprise impermanent/function-limiting messaging functionality, and sending/receiving client devices may be adapted to fallback to a distributed network (e.g. Internet, cellular) and/or an enterprise communication network, when direct transmission functionality is unavailable.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying figures:

In FIG. 5B there is shown, in accordance with some embodiments of the present invention, an exemplary configuration where the messaging server is adapted to send the receiving client device a floating agent application for enforcing the message attributes;

In FIG. 5F there is shown, in accordance with some embodiments of the present invention, an exemplary configuration where an attribute(s) containing message may be sent directly from the sending client device to the receiving client device, in an encrypted form;

In FIG. 5H there is shown, in accordance with some embodiments of the present invention, an exemplary configuration where an attribute(s) containing message may be sent from the sending client device to the messaging server, in an encrypted form; and In FIGS. 6A-6G there are shown, in accordance with some embodiments of the present invention, a few exemplary system(s) and network(s) configurations for handling and communicating impermanent and/or function-limiting attribute(s) containing messages.

DETAILED DESCRIPTION

Figure 1:
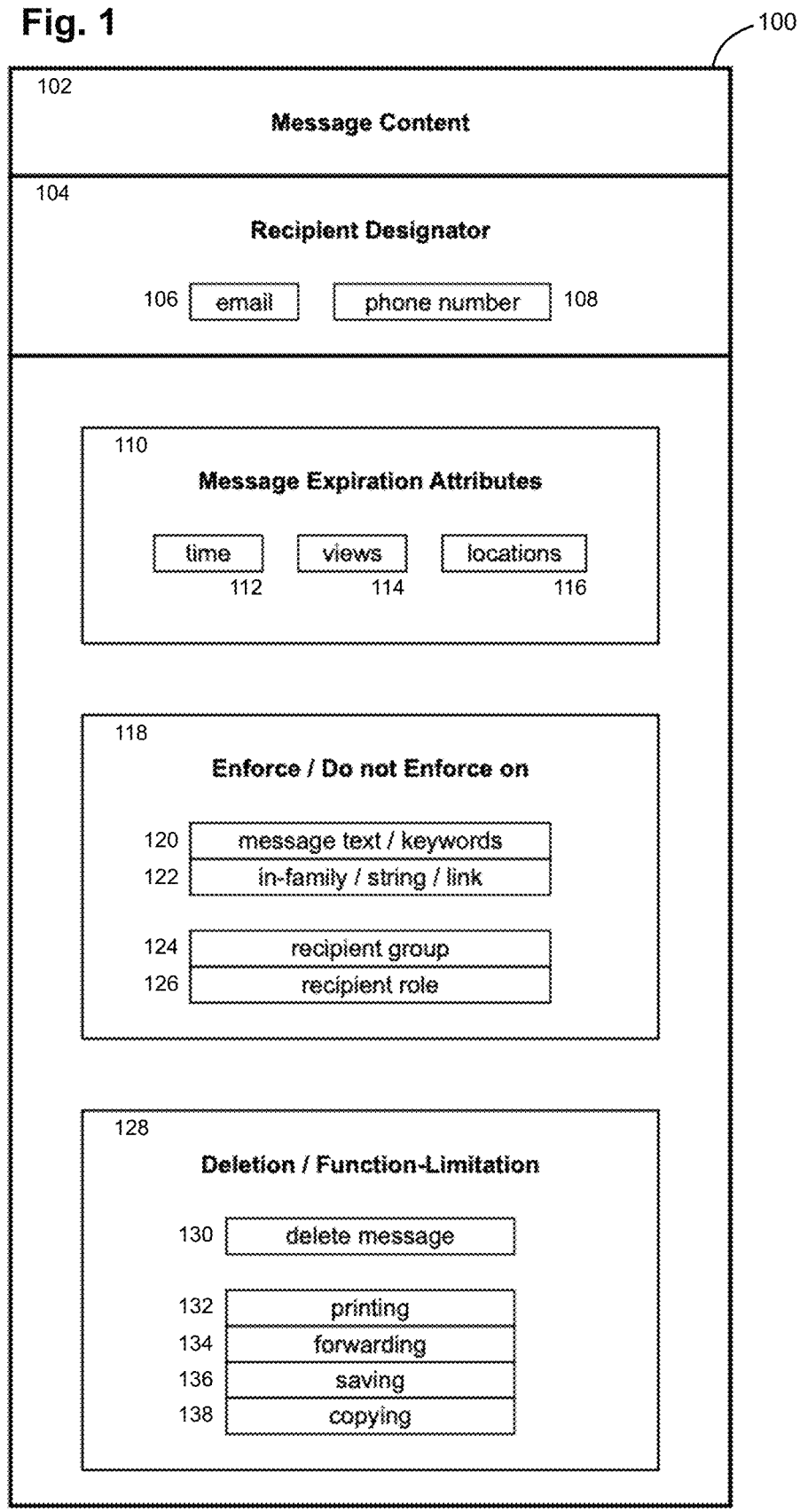
In FIG. 1 there is shown, in accordance with some embodiments of the present invention, an exemplary structure of a message.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. Such apparatus may be specially constructed for the desired purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The present invention is a messaging system, apparatuses circuits and methods of operation thereof. A message, in accordance with some embodiments of the present invention, may comprise one or more message attributes, defining the characteristics of parameters such as its lifespan, accessibility and/or functionality. The message attributes may include, for example, limitations relating to the time duration through which the message may be accessed, the number of times the message may be accessed, the geographical area in which the message may be accessed, the ability to print the message, the ability to save the message, the ability to forward the message and/or any other way in which the message's functionality may be limited.

In FIG. 1 there is shown, in accordance with some embodiments of the present invention, an exemplary structure of a message 100 comprising: the message's content 102, the recipient designator(s) 104 (e.g. recipient email 106 and phone number 108), the message expiration attributes 110, message attribute enforcement policies 118 defining the scope of enforcement and the message functionalities to be limited as attribute threshold(s) are met. It is made clear that a message, in accordance with some embodiments of the present invention, may be sent to one or more recipients or receiving client devices and may contain or have attachments containing any type of content(s) 102 (e.g. text, images, video, audio). The message expiration attributes 110 can be further specified by time 112 (e.g. number of hours from message creation, sending and receipt), views 114 (e.g. number of views by recipient), and locations 116 (e.g. after receiving device has entered or left a location). The message attribute enforcement policies (enforce/do not enforce on) 118 can be further specified by messages containing the following text/keywords 120, messages which are in-family/string/link 122 to a message containing the following text/keywords 120, message recipient groups 124, and message recipient roles 128. The deletion/function-limitation 128 can be further configured to delete the message 130, and not allowing for message printing 132, forwarding 134, saving 136, and copying 138. According to some embodiments, as part of limiting a given message's functionality, the quality of one or more of its contained/attached content(s) (e.g. text, images, video, audio) may be degraded. Furthermore, the terms 'message' and/or 'impermanent message', as used hereinafter, may relate to any message or type of message associated with one or more attribute(s) and/or policy (ies), which attribute(s) and/or policy (ies) may define the characteristics of one or more parameters such as the message's lifespan, accessibility and/or functionality.

According to some embodiments of the present invention, the message attributes may be defined/authored by a user of a sending client device. According to some embodiments of the present invention, a messaging server may append and/or add additional message attributes to a message, and/or edit message attributes defined/authored by the user of the sending client device.

According to some embodiments of the present invention, a message authoring application may allow for the user of the sending client device to compose and/or edit the message's content 102 and attributes 110.

Figure 2:
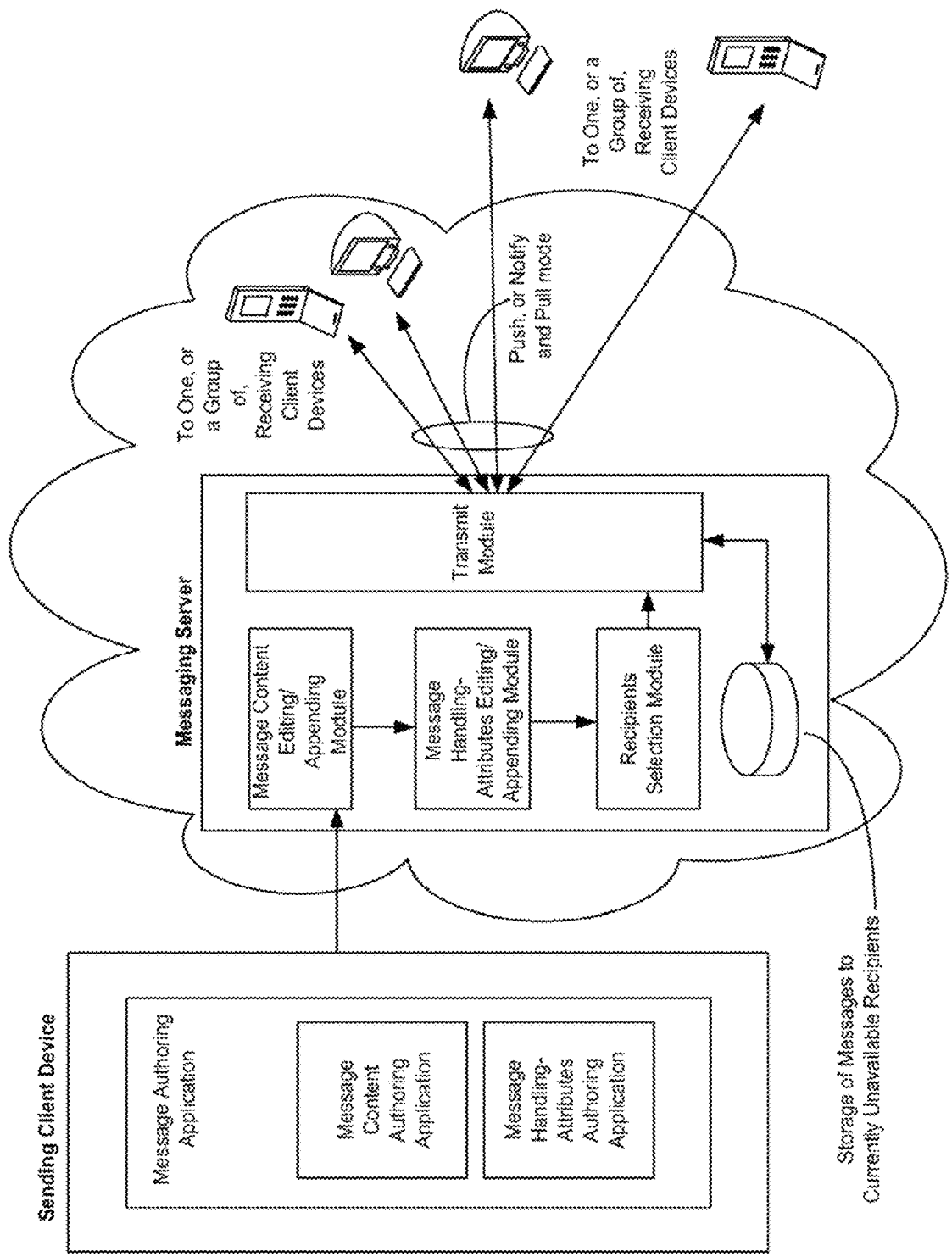
In FIG. 2 there is shown, in accordance with some embodiments of the present invention, a sending client device comprising a message authoring application for authoring message content and/or message handling attributes.

In FIG. 2 there is shown, in accordance with some embodiments of the present invention, a sending client device comprising a message authoring application for authoring message content and/or message handling attributes. A networked messaging server may edit and/or append, or allow for editing and/or appending of, message content and/or message handling attributes. A recipient selection module may select one or more recipients or append one or more designators of recipients to which the message is intended (e.g. based on a selection made by the message author/sender). A transmit module may then send the message to one or a group of receiving client devices, corresponding to selected recipient(s), within the same network or on another accessible network. According to some embodiments, the message may be sent to the receiving client device in a 'push' mode or, alternatively, a notification informing the receipt of a new message at the server may be sent to the receiving client device, which receiving device may then 'pull' the message from the server. According to some embodiments, the messaging server may comprise a database for storing messages sent to receiving client devices which are not available (e.g. not connected to the server/in a no reception zone/not online) or for storing messages delivered in 'pull' mode, awaiting for receiving client device retrieval.

Figure 3A:
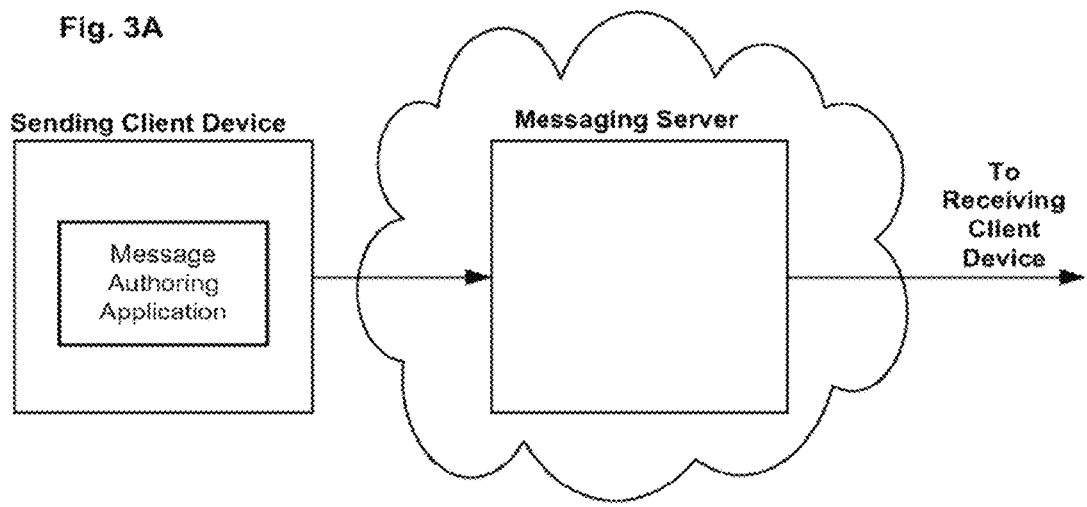
In FIG. 3A-3C there are shown, in accordance with some embodiments of the present invention, a message authoring application residing on the sending client device (3A), on the messaging server (3B) and/or on another dedicated or non-dedicated networked authoring server (3C) accessible by the sending client device.
Figure 3B:
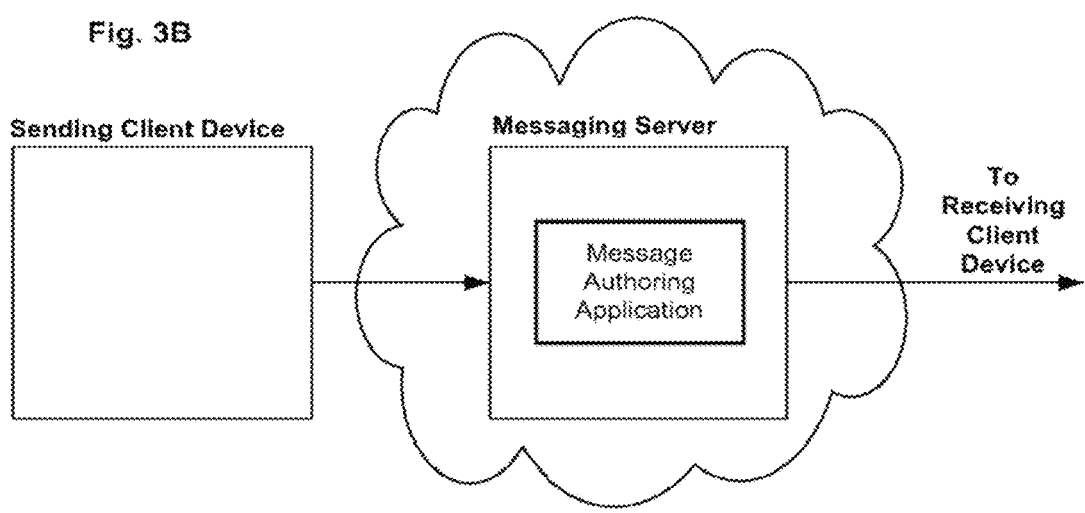
Figure 3C:
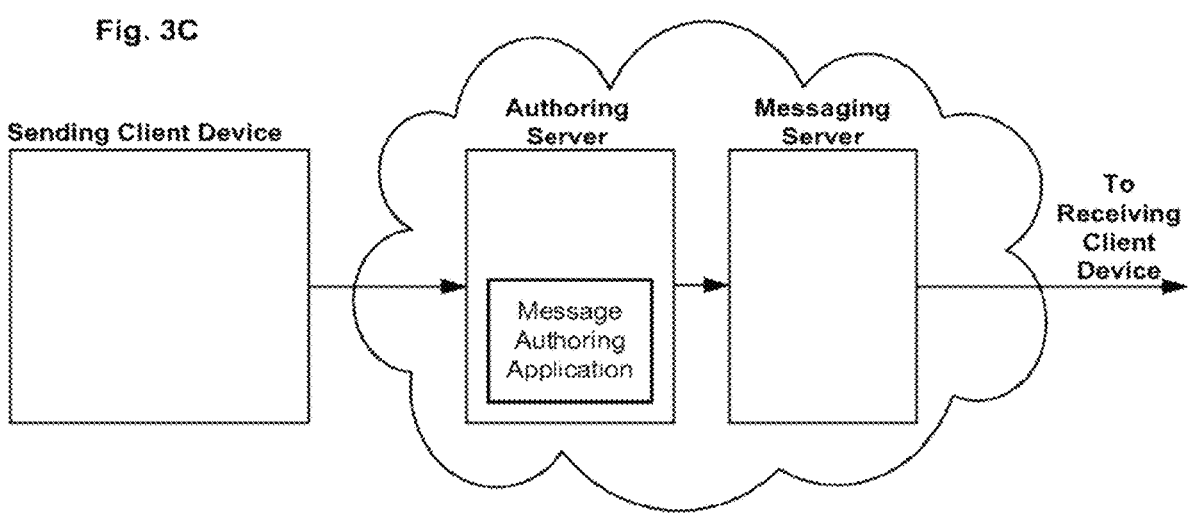

In FIG. 3A-3C there are shown, in accordance with some embodiments of the present invention, a message authoring application residing on the sending client device (3A), on the messaging server (3B) and/or on another dedicated or non-dedicated networked authoring server (3C) accessible by the sending client device. According to some embodiments, message authoring applications may reside on more than one of the above mentioned devices/servers.

Figure 4:
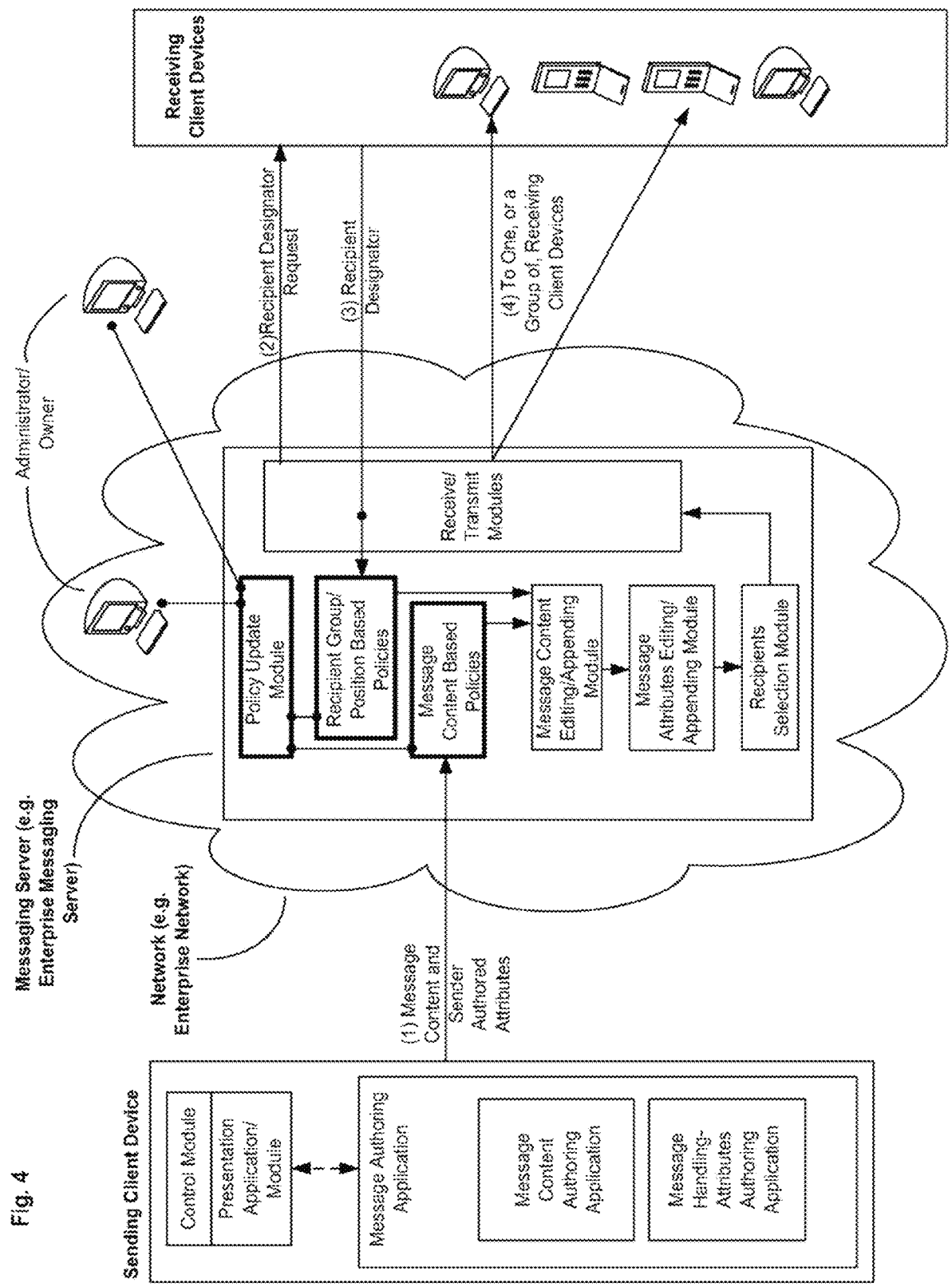
In FIG. 4 there is shown, in accordance with some embodiments of the present invention, an exemplary configuration in which a messaging server (e.g. an enterprise messaging server) is adapted to allow for message attributes policies definition and updating.

According to some embodiments of the present invention, one or more message attributes policies each comprising one or more message functionality limitations may be defined. The message attributes policies may be enforced based, for example, on characteristics such as message content and/or recipient group/position. In FIG. 4 there is shown, in accordance with some embodiments of the present invention, an exemplary configuration in which a messaging server (e.g. an enterprise messaging server) is adapted to allow for message attributes policies definition and updating. Recipient group/position based policies may be enforced based on the receiving client device(s)' designator(s) provided by the receiving client device(s), whereas message content based policies may be enforced based on the content of given messages as received by the messaging server, prior to their forwarding to the receiving device(s). A policy update module may be adapted to allow for the definition and/or updating of policies (e.g. by an administrator/owner/sender), from within the messaging server's network and/or from another network or networked administrator/owner computerized device which are connected to the messaging server's network.

According to some embodiments of the present invention, an enforcement module may be adapted to enforce the message attributes. According to some embodiments, a receiving client device may comprise an enforcement module adapted to enforce the message attributes on some or all of its incoming messages. The enforcement module may erase and/or limit the functionality of a given message based on its message attributes, substantially at the time of receipt and/or as certain attribute defined threshold(s) is/are met (e.g. delete the message once a certain amount of time has passed from its time of receipt). According to some embodiments of the present invention, the messaging server may comprise an authentication module and/or a verification module adapted to authenticate the receiving client device and/or to verify its message attribute enforcement capabilities (e.g. the existence/functionality of its enforcement module circuit/application), prior to forwarding a message to it.

Figure 5A:
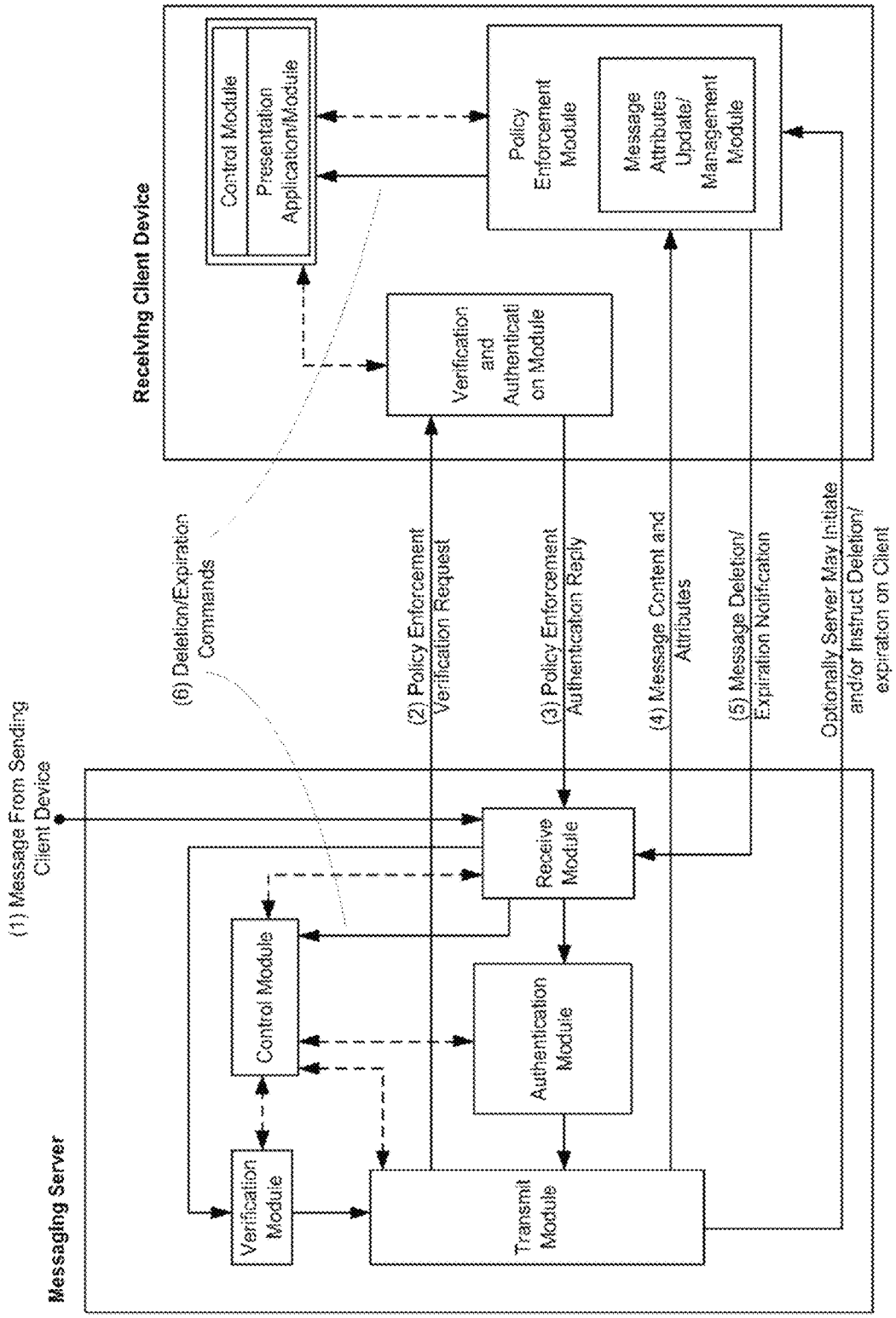
In FIG. 5A there is shown, in accordance with some embodiments of the present invention, an exemplary configuration where the receiving client device is adapted to enforce the message attributes.

In FIG. 5A there is shown, in accordance with some embodiments of the present invention, an exemplary configuration where the receiving client device is adapted to enforce the message attributes. A message from a sending client device is received by the messaging server, the messaging server then sends a policy enforcement verification request to the receiving client device. Upon receipt of a policy enforcement authentication reply, the messaging server proceeds to forward the message content and attributes to the receiving client device. When one or more of the message's attributes are expired, the receiving client device notifies the messaging server by sending it a message deletion/expiration notification. Both, the messaging server and the receiving client device may then issue deletion/expiration and/or corresponding functionality limitation commands to their respective control modules, which commands either delete completely or limit the functionality of their respective message copies. According to some embodiments, the messaging server may optionally initiate the deletion/expiration and/or function limitation of a message, and may be adapted to accordingly instruct the client device(s).

According to some embodiments of the present invention, the messaging server may send the receiving client device a floating agent application installation file, adapted to install itself on the receiving client device and to enforce the message attributes, prior to forwarding the message to it. Once a floating agent application installation notification, confirming the installation of the floating agent on the receiving client device, is received by the messaging server, the server may proceed to forward the message to the receiving client device. The now installed floating agent application may enforce the message attributes.

In FIG. 5B there is shown, in accordance with some embodiments of the present invention, an exemplary configuration where the messaging server is adapted to send the receiving client device a floating agent application for enforcing the message attributes. A message from a sending client device is received by the messaging server, the messaging server then sends a floating agent application installation file to the receiving client device. Upon receipt of a floating agent application installation confirmation, the messaging server proceeds to forward the message content and attributes to the receiving client device. When one or more of the message's attributes are expired, the floating agent application issues a notice and the receiving client device notifies the messaging server by sending it a message deletion/expiration notification. Both, the messaging server and the receiving client device may then issue deletion/expiration and/or corresponding functionality limitation commands to their respective control modules, which commands either delete completely or limit the functionality of their respective message copies.

According to some embodiments of the present invention, relating to direct device to device communications, for example, peer to peer type networks; the sending client device may comprise an authentication module and/or a verification module adapted to authenticate the receiving client device and/or to verify its message attribute enforcement capabilities (e.g. the existence/functionality of its enforcement module circuit/application). Once the receiving client device has been authenticated/verified, the sending client device may send the message directly to it. The receiving client device's policy enforcement module may issue an expiration, functionality-limitation and/or deletion command upon expiration of one or more of the message's expiration attributes.

Figure 5C:
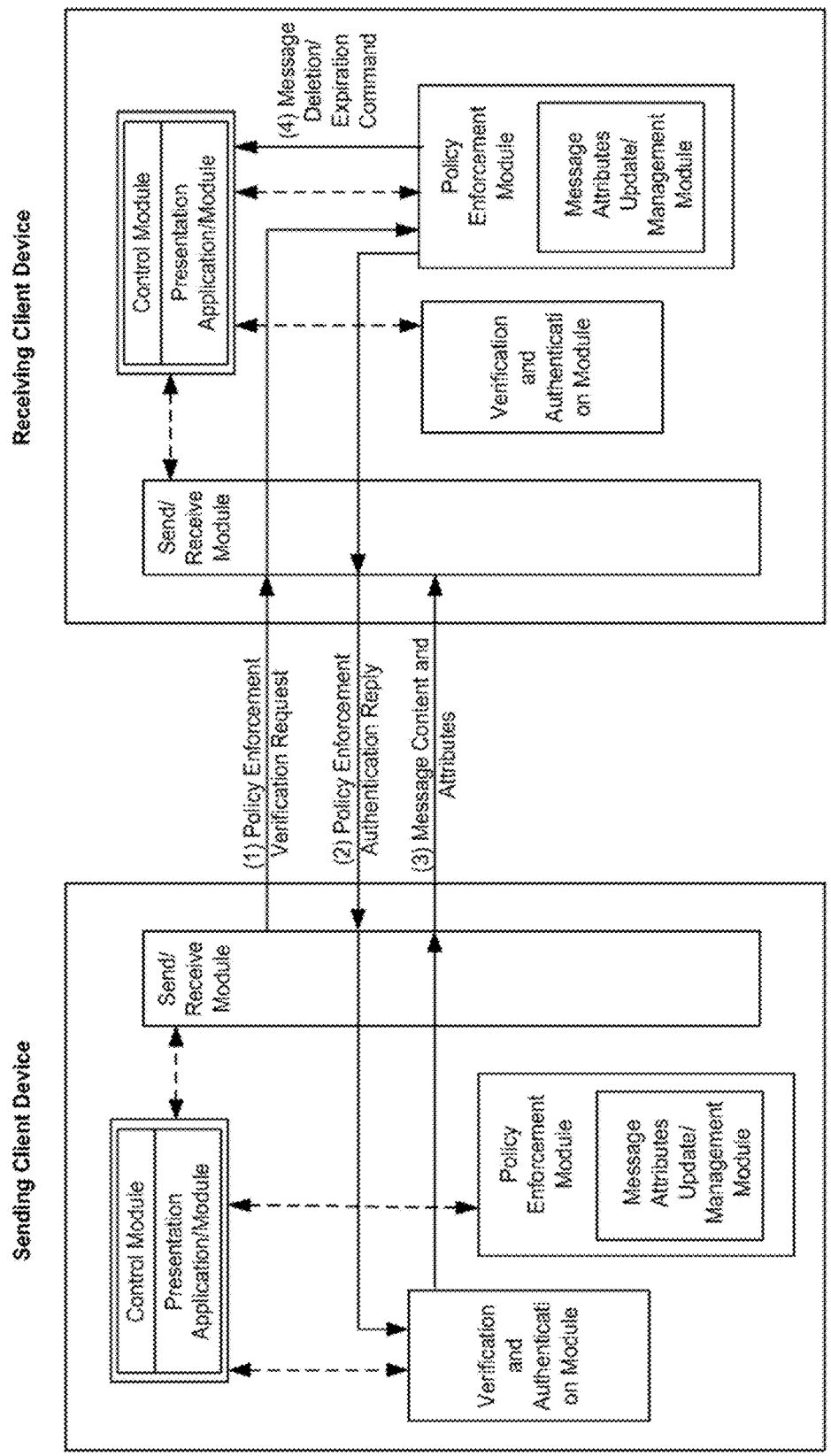
In FIG. 5C there is shown, in accordance with some embodiments of the present invention, an exemplary configuration where two client devices are adapted to send messages directly to one another.

In FIG. 5C there is shown, in accordance with some embodiments of the present invention, an exemplary configuration where two client devices are adapted to send messages directly to one another. The sending client device may send to the receiving client device a policy enforcement verification request. Upon receipt and verification/authentication of the receiving client device's policy enforcement authentication reply, the sending client device may proceed to send it the message content and attributes.

According to some embodiments of the present invention, the messaging server may comprise an enforcement module adapted to enforce the message attributes on some or all of its incoming messages. The enforcement module may erase and/or limit the functionality of a given message based its message attributes, substantially at the time of receipt and/or as certain attribute defined threshold(s) is/are met (e.g. delete the message once a certain amount of time has passed from its time of receipt). The messaging server may comprise a message page generation and storage module adapted to generate and store a browser renderable code (e.g. HTML page, WAP page), herein code includes message content. The messaging server may then send the receiving client device a link to the message content including page. The messaging server's enforcement module may check and possibly update a given message's attribute(s) intermittently (e.g. as time to expiration and deletion of a message is decreasing), each time the page including the message is linked (e.g. as the number of attribute allowed message views decreases with each linkage to it) and/or as a result of an external intervention by an administrator/owner using an attribute update/management module, of the messaging server, adapted to allow for deleting, editing and/or appending message attributes and/or message attribute policies. Upon expiration of one or more message attributes, and possibly the deletion of the message, a message deletion/expiration notification may be send to the receiving client device by the messaging server.

Figure 5D:
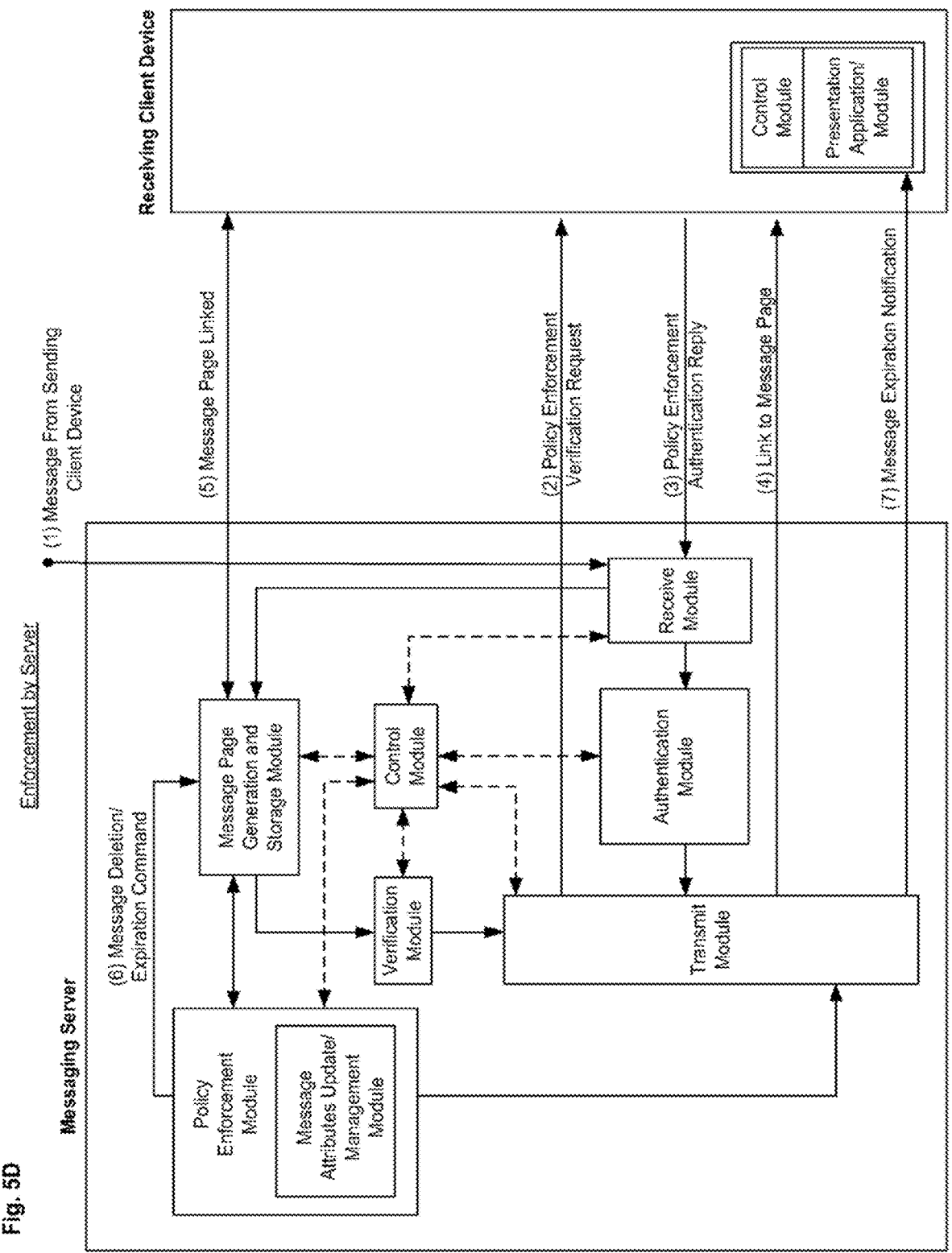
In FIG. 5D there is shown, in accordance with some embodiments of the present invention, an exemplary configuration where the messaging server comprises a message attribute enforcement module.

In FIG. 5D there is shown, in accordance with some embodiments of the present invention, an exemplary configuration where the messaging server comprises a message attribute enforcement module. A message from a sending client device is received by the messaging server and a message page (e.g. webpage) is generated and stored by a message page generation and storage module, functionally associated with the enforcement module. A link to the message page is then sent to the receiving client device which may use it access the message page and its content. Upon expiration of one or more of the message attributes a message deletion/expiration command may be sent by the enforcement module to the message page generation and storage module, the message page generation and storage module may, in response, delete, remove or else wise limit the functionality and/or accessibility of the message including page and its included content. A message expiration notification may then be sent to the receiving client device, informing its user of the deletion/removal/limitation of functionality.

Figure 5E:
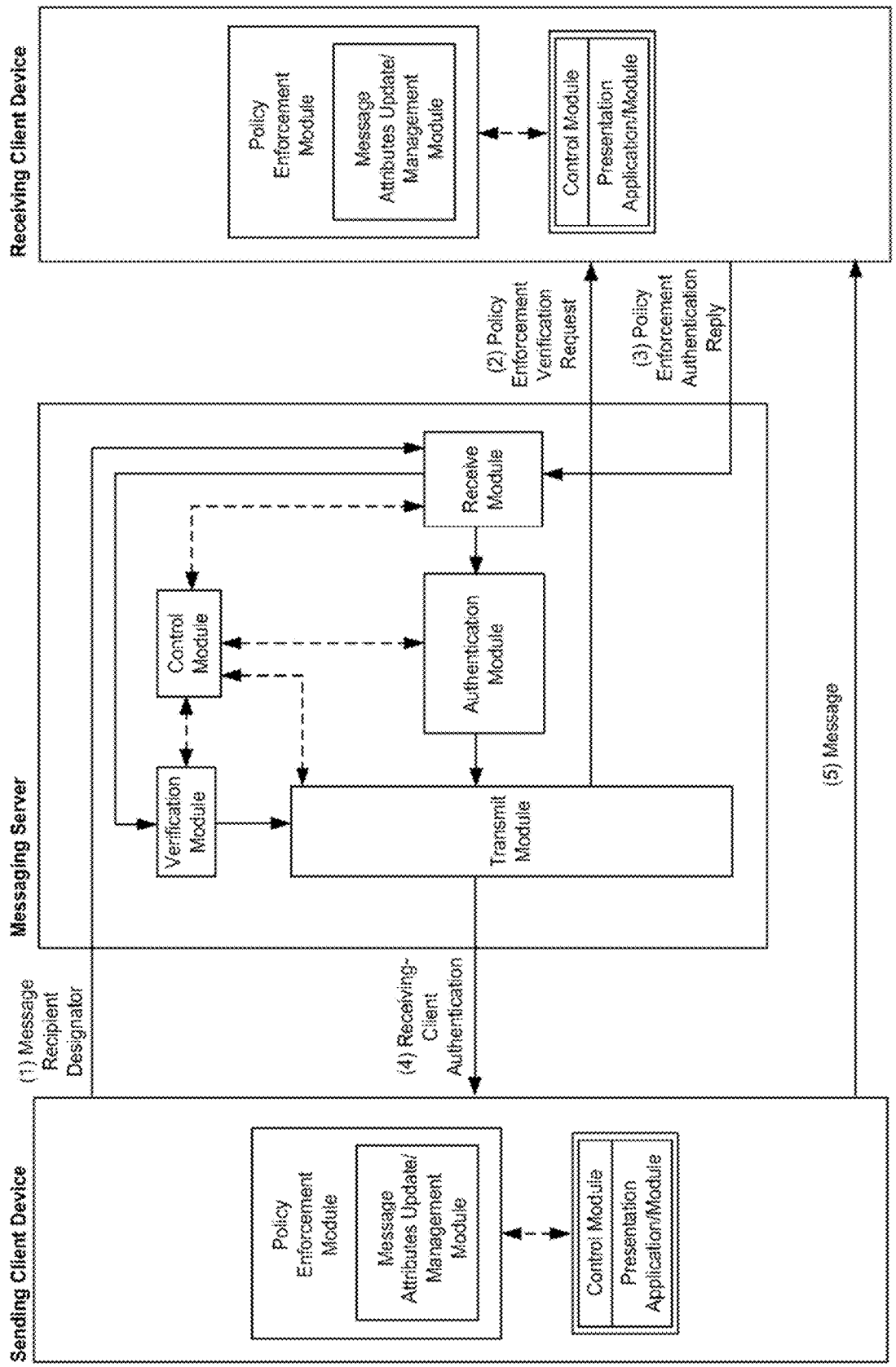
In FIG. 5E there is shown, in accordance with some embodiments of the present invention, an exemplary configuration where the client devices comprise message attribute enforcement modules and the sending client device is adapted to verify the receiving client device's ability to enforce message attributes by use of the messaging server.

In FIG. 5E there is shown, in accordance with some embodiments of the present invention, an exemplary configuration where the client devices comprise message attribute enforcement modules and the sending client device is adapted to verify the receiving client device's ability to enforce message attributes by use of the messaging server. The sending client device may initially send the message recipient designator to the messaging server. Based on the recipient designator the messaging server may send an enforcement verification request to the receiving client device. Upon receipt of an enforcement authentication reply the messaging server may send a receiving client device authentication message to the sending client device that may now proceed and send the message.

According to some embodiments of the present invention, an attribute containing message may be encrypted by the sending client device prior to its sending. In FIG. 5F there is shown, in accordance with some embodiments of the present invention, an exemplary configuration where an attribute(s) containing message may be sent directly from the sending client device to the receiving client device, in an encrypted form. The receiving client device may then send a self-verification request to the messaging server, receive in return an enforcement verification request and reply to it with an enforcement authentication reply authenticating its ability to enforce message attribute/attribute policies. Once the messaging server's authentication module and/or verification module have authenticated and verified the receiving client device as message attribute enforcement capable, the receiving client device may send the received message's encryption attributes to the messaging server and receive, in return, the corresponding message decryption key(s) to be used by its decryption module to decrypt the encrypted message. Further enforcement of the message attributes may be handled by the receiving client device enforcement module.

Figure 5G:
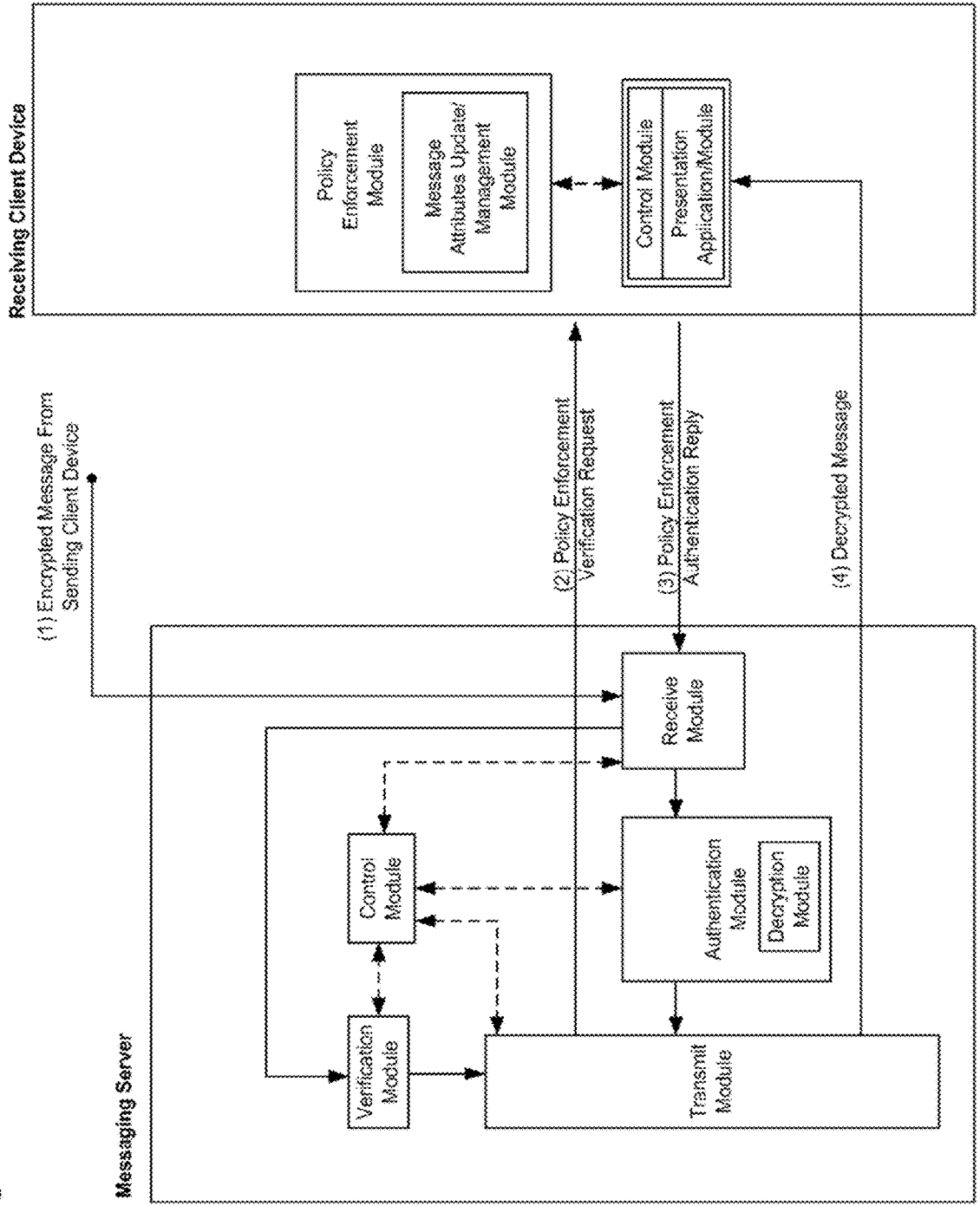
In FIG. 5G there is shown, in accordance with some embodiments of the present invention, an exemplary configuration where an attribute(s) containing message may be sent from the sending client device to the messaging server, in an encrypted form.

In FIG. 5G there is shown, in accordance with some embodiments of the present invention, an exemplary configuration where an attribute(s) containing message may be sent from the sending client device to the messaging server, in an encrypted form. The messaging server may then send an enforcement verification request to the receiving client device and receive in response an enforcement authentication reply. Once the messaging server's authentication module and/or verification module have authenticated and verified the receiving client device as message attribute enforcement capable, it may use its decryption module to decrypt the encrypted message and send it to the receiving client device. Further enforcement of the message attributes may be handled by the receiving client device enforcement module.

In FIG. 5H there is shown, in accordance with some embodiments of the present invention, an exemplary configuration where an attribute(s) containing message may be sent from the sending client device to the messaging server, in an encrypted form. The messaging server may then send an enforcement verification request to the receiving client device and receive in response an enforcement authentication reply. Once the messaging server's authentication module and/or verification module have authenticated and verified the receiving client device as message attribute enforcement capable, it may forward the encrypted message to the receiving client device may use its decryption module, possibly using one or more decryption keys it possesses to decrypt the encrypted message. Further enforcement of the message attributes may be handled by the receiving client device enforcement module.

In FIGS. 6A-6G there are shown, in accordance with some embodiments of the present invention, a few exemplary system(s) and network(s) configurations for handling and communicating impermanent and/or function-limiting attribute(s) containing messages.

Figure 6A:
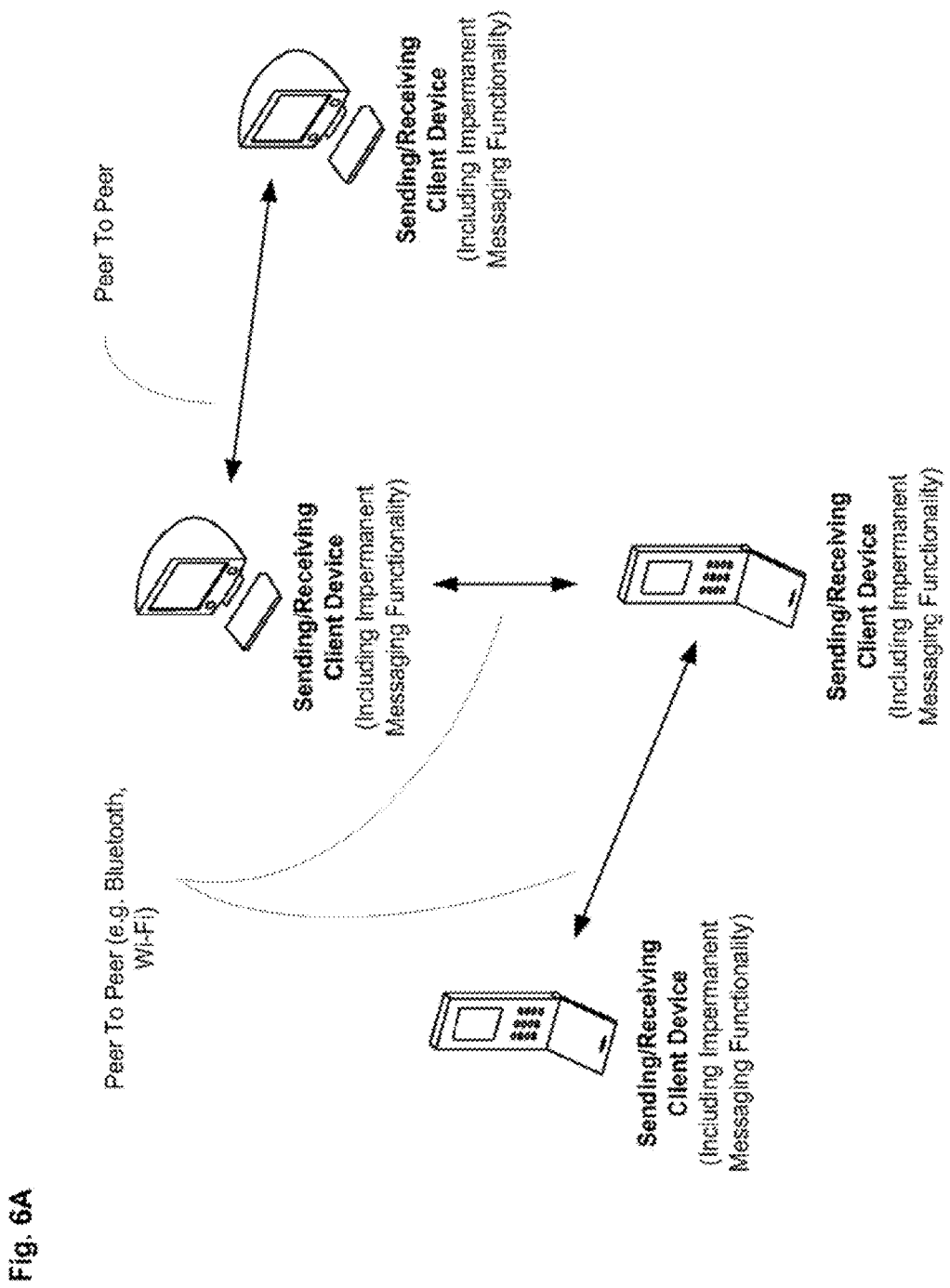

In FIG. 6A there is shown, in accordance with some embodiments of the present invention, a direct device to device communication configuration (e.g. peer to peer) wherein each sending and/or receiving device may comprise impermanent/function-limiting messaging functionality.

Figure 6B:
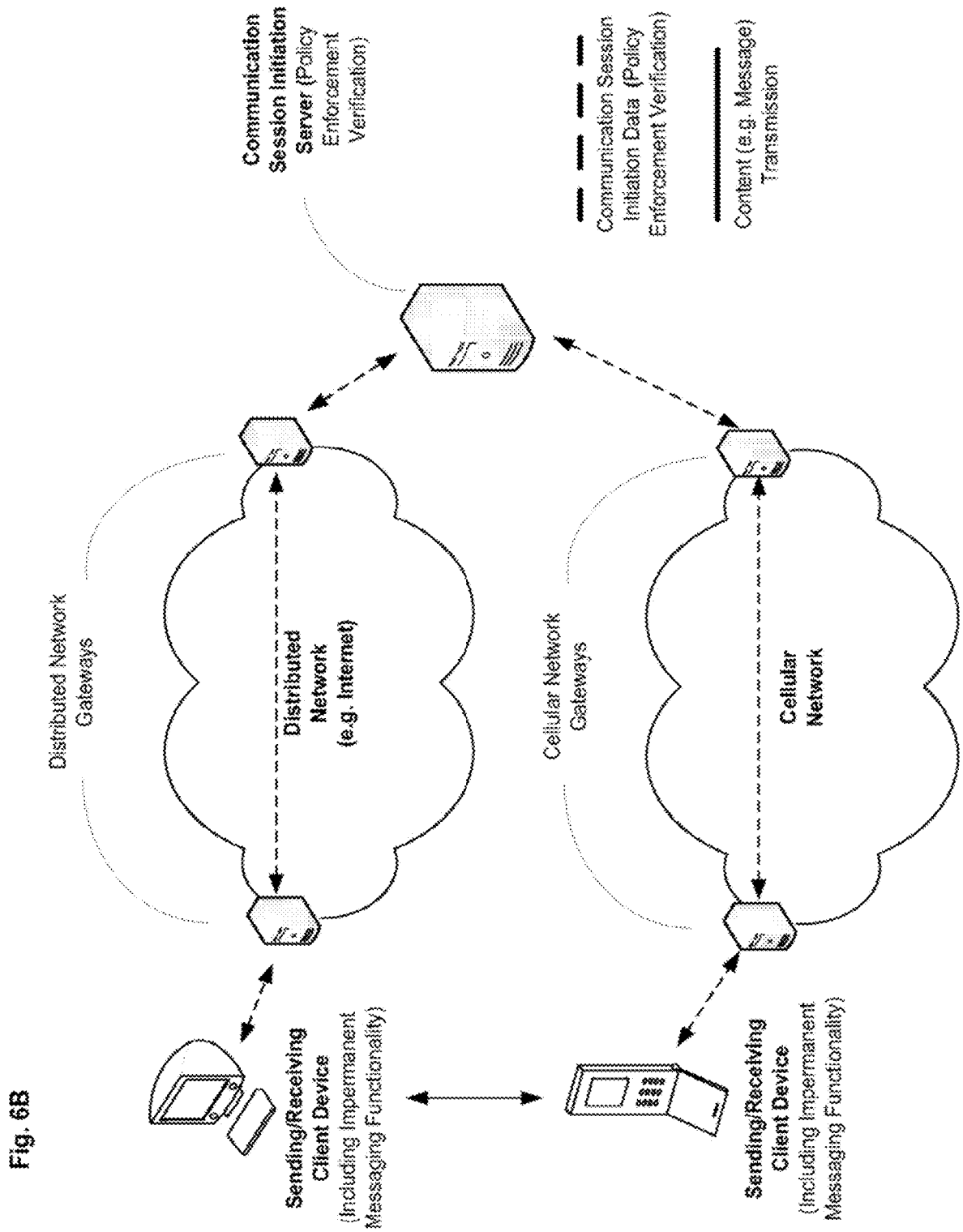

In FIG. 6B there is shown, in accordance with some embodiments of the present invention, a communication configuration wherein client devices may directly send/receive impermanent/function-limiting messages to each other. Impermanent/function-limiting messaging functionality enforcement verification data is initially communicated over one or more cellular and/or one or more distributed networks between the two client devices. Upon authentication of the receiving client device as impermanent/function-limiting messaging functionality capable, the message is directly sent to it by the sending client device. All such messages may thus be subject to impermanent/function-limiting messaging functionality handling and enforcement.

According to some embodiments of the present invention, some or all of the messaging system functionalities may be implemented on a cellular and/or distributed network's gateway or gatekeeper server(s). Accordingly, a gateway or gatekeeper server may comprise an authoring application module, an attribute enforcement module and/or native client attribute enforcement verification/authentication module(s) adapted to verify native client devices' compliance with message attributes enforcement, prior to the forwarding of attribute containing messages to them.

Figure 6C:
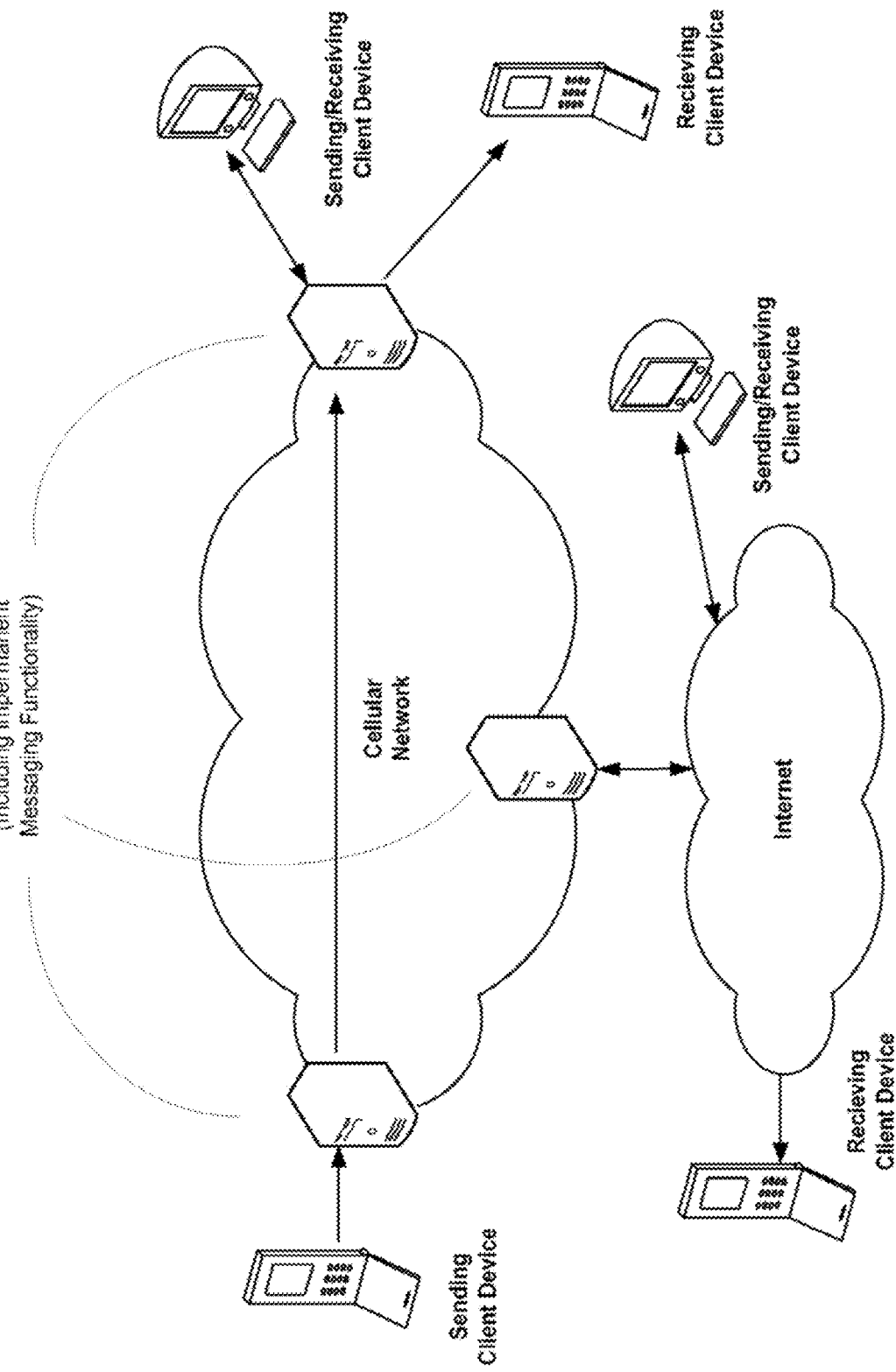

In FIG. 6C there is shown, in accordance with some embodiments of the present invention, a communication configuration wherein cellular network gateways comprise impermanent/function-limiting messaging functionality. A message being sent from a cellular networked device or from an Internet networked device must pass through one of the cellular network gateways, prior to being communicated over the cellular network to one or more receiving client devices, and is thus subject to impermanent/function-limiting messaging functionality handling and enforcement.

Figure 6D:
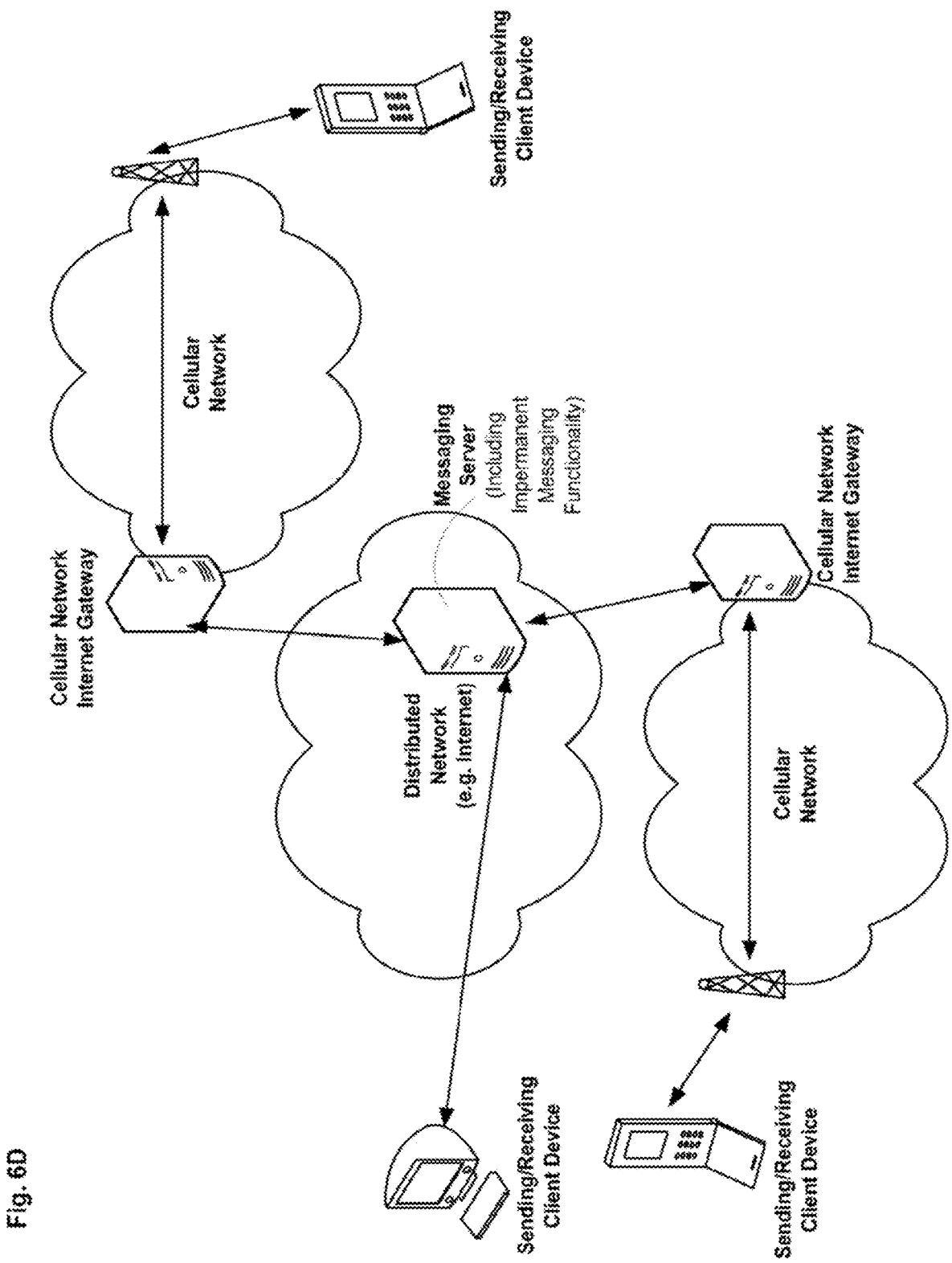

In FIG. 6D there is shown, in accordance with some embodiments of the present invention, a communication configuration wherein client devices of one or more cellular networks and/or distributed networks may send/receive impermanent/function-limiting messages. A message from a distributed network's sending client device is sent through the distributed network's messaging server having an impermanent/function-limiting messaging functionality. The message is then sent to a cellular network Internet gateway and from there, over the cellular network to the cellular receiving client device. A message from a cellular client to a distributed network client may first be sent over the cellular network to the cellular network Internet gateway and to the distributed network receiving client device through the messaging server. All such messages may thus be subject to impermanent/function-limiting messaging functionality handling and enforcement.

In FIG. 6E there is shown, in accordance with some embodiments of the present invention, a communication configuration wherein client devices of different cellular networks may send/receive impermanent/function-limiting messages to each other. Two or more Native SMS/MMS gateways/servers may comprise enforcement verification/authentication modules adapted to verify the ability of the receiving client device's cellular network gateways to handle and enforce impermanent/function-limiting messaging functionality. Once enforcement capability has been verified, the message may be sent to the receiving client device through its cellular gateway having verified impermanent/function-limiting messaging functionality. All such messages may thus be subject to impermanent/function-limiting messaging functionality handling and enforcement.

Figure 6F:
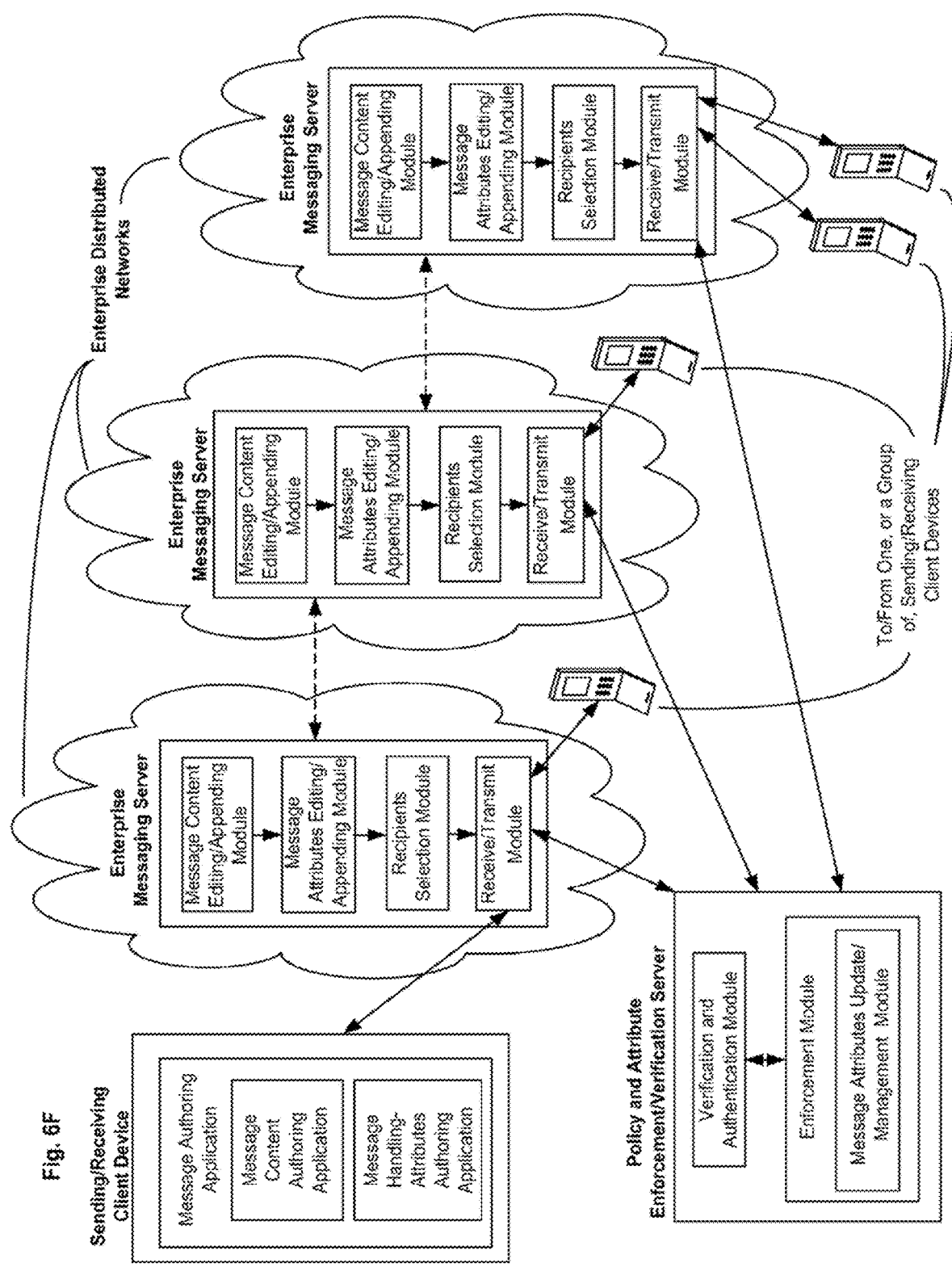

In FIG. 6F there is shown, in accordance with some embodiments of the present invention, a communication configuration wherein client devices of similar and/or different enterprise networks may send/receive impermanent/function-limiting messages to each other. A given client device may initially send a message to its own enterprise's enterprise messaging server, where the message's content and/or attributes may be edited and/or additional content and/or attributes may be appended. The message may then be sent to a policy and attribute enforcement/verification server adapted to either enforce the message's attributes and/or related enterprise policies, or to verify the receiving client device(s)' ability to enforce the message's attributes and/or related enterprise policies. The message may then be sent to the receiving client device(s), which receiving client device(s) may be part of either the same enterprise's network or part of another enterprise network.

Figure 6G:
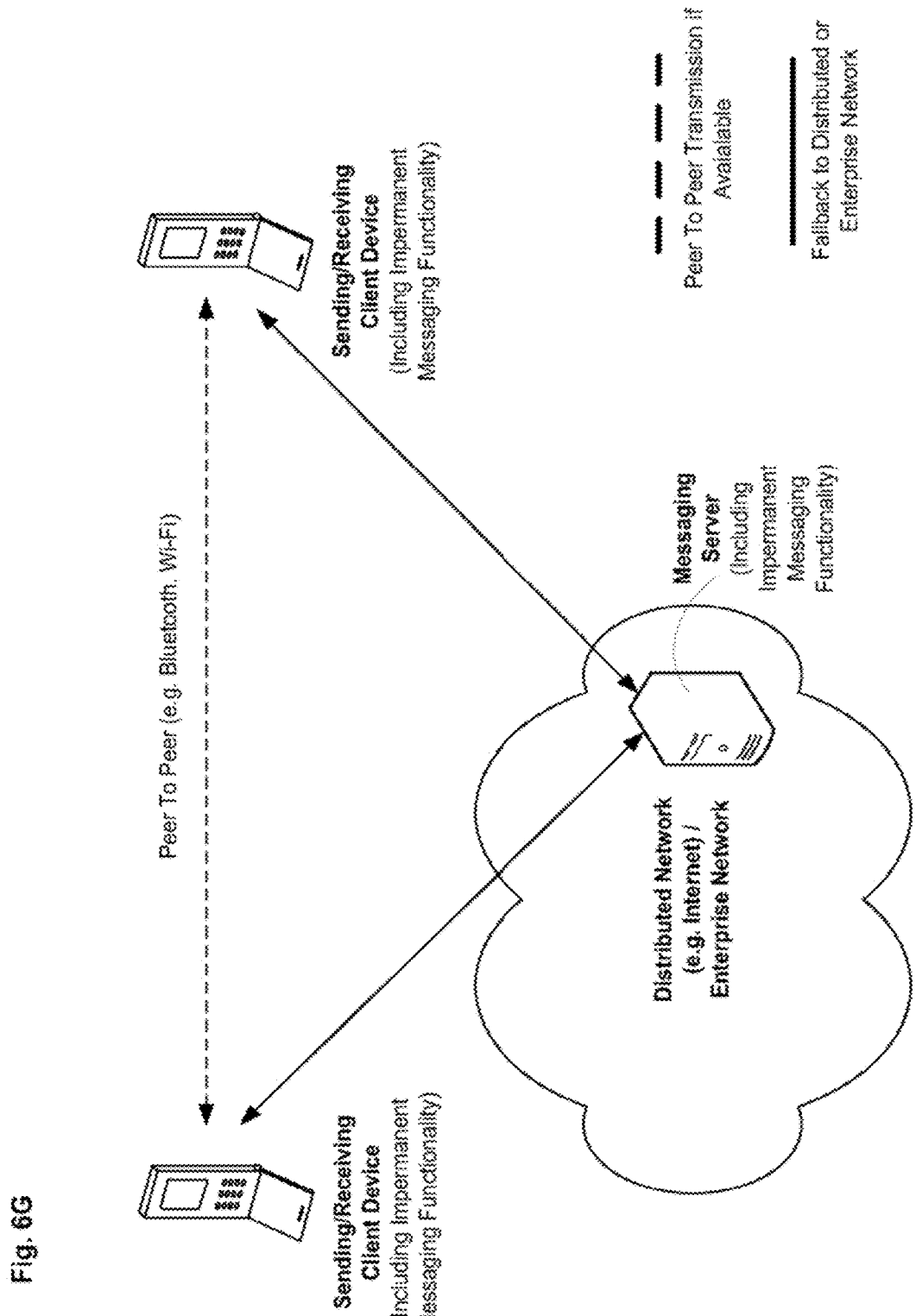

In FIG. 6G there is shown, in accordance with some embodiments of the present invention, a direct device to device communication configuration (e.g. peer to peer) wherein each sending and/or receiving device may comprise impermanent/function-limiting messaging functionality. In this exemplary configuration, sending/receiving client devices may be adapted to fallback to a distributed network (e.g. Internet, cellular) and/or an enterprise communication network, when direct transmission functionality is unavailable. It is made clear that various additional impermanent/function-limiting messaging fallback-enabling configurations may be practiced. Impermanent/function-limiting messaging functionality may thus be implemented on two or more communication levels/networks, wherein a first level serves as a default communication configuration and one or more additional levels function as fallback communication configuration(s) for scenarios where the default level is unavailable. Furthermore, moving from one impermanent/function-limiting messaging communication configuration to another may be partially or fully based on aggregative communication optimization factors (e.g. available transmission bandwidth).

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method for managing messaging system in communication with a messaging server comprising the steps of:
   a) receiving a message at least partially encrypted with a first encryption from a first mobile messaging client device executing a messaging application and associated with a first authorized user;
   b) storing the message in a database;
   c) transmitting, to a second mobile messaging client device executing the messaging application and associated with a second authorized user, a notification of the presence of the message, where the message is addressed to the second authorized user;
   d) receiving from the second mobile messaging client device a request to retrieve the message;
   e) accessing a message attribute comprising an instruction to limit a functionality of the message;
   f) applying the message attribute to the message based on a message characteristic and updating any existing corresponding message attribute; and
   g) transmitting the message and the message attribute to the second mobile messaging client device that decrypts the message and manages the message in accordance with the message attribute, where at least one of the message and the message attribute are stored in non-volatile memory in the second mobile messaging client device at least until the message is managed by the second mobile messaging client device in accordance with the message attribute, and wherein managing the message comprises limiting the functionality of the message based on the message attribute.

2. The method of claim 1, wherein d) further comprises: receiving from the second mobile messaging client device a request to retrieve the message, the request comprising client authentication data.

3. The method of claim 2, further comprising: the step of, prior to g), validating the second mobile messaging client device based on the client authentication data.

4. The method of claim 1, wherein the message characteristic comprises content of the message.

5. The method of claim 1, wherein the message characteristic comprises a recipient of the message.

6. The method of claim 1, further comprising the steps of:
   h) receiving an updated message attribute comprising an instruction to limit a functionality of the message;
   i) applying the updated message attribute to the message and updating any existing corresponding message attribute; and
   j) transmitting at least the updated message attribute to the second mobile messaging client device.

7. The method of claim 1, further comprising: h) receiving from the second mobile messaging client device an automatic notification that the second mobile messaging client device has managed the message in accordance with the message attribute.

8. The method of claim 1, further comprising: h) transmitting to the second mobile messaging client device additional message attributes for the message.

9. The method of claim 1, wherein the message attribute is a predetermined message deletion time.

10. The method of claim 9, wherein the predetermined message deletion time is based on a time the second mobile messaging client device first displays the message.

11. The method of claim 1, wherein the message attribute is an amount of time during which the message may be accessed at the second mobile messaging client device.

12. The method of claim 1, wherein the message attribute is a number of times the message may be accessed at the second mobile messaging client device.

13. The method of claim 1, wherein the message attribute designates a geographic location of the second mobile messaging client device in which the message may be accessed.

14. The method of claim 1, wherein the message attribute comprises one or more of an ability to print, save, and forward the message.

15. The method of claim 1, wherein the message content includes at least one of text and an attachment.

16. The method of claim 1, wherein the first authorized user defines the message attribute of the message.

17. The method of claim 1 or 16, further comprising: editing the message attribute of the message.

18. The method of claim 1 or 16, further comprising: adding one or more additional message attributes to the message.

19. The method of claim 1, wherein the message attribute is defined by a user having an administrator privilege.

20. The method of claim 1 or 19, wherein the message has an identified recipient group and the attribute of the message is based on the identified recipient group of the message.

21. The method of claim 1 or 19, wherein the message has an identified recipient position and the attribute of the message is based on the identified recipient position of the message.

* * * * *